(12) United States Patent
Takase et al.

(10) Patent No.: US 9,976,466 B2
(45) Date of Patent: May 22, 2018

(54) HONEYCOMB TYPE HEATING DEVICE, METHOD OF USING THE SAME, AND METHOD OF MANUFACTURING THE SAME

(71) Applicant: NGK INSULATORS, LTD., Nagoya (JP)

(72) Inventors: Naoya Takase, Nagoya (JP); Kazumi Mase, Nagoya (JP); Yoshiyuki Kasai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days. days.

(21) Appl. No.: 15/409,854

(22) Filed: Jan. 19, 2017

(65) Prior Publication Data

US 2017/0260887 A1 Sep. 14, 2017

(30) Foreign Application Priority Data

Mar. 14, 2016 (JP) .................................. 2016-049311

(51) Int. Cl.
*B01D 53/94* (2006.01)
*B01J 35/04* (2006.01)
(Continued)

(52) U.S. Cl.
CPC ........... *F01N 3/2828* (2013.01); *B01D 53/94* (2013.01); *B01J 35/04* (2013.01); *F01N 3/2026* (2013.01);
(Continued)

(58) Field of Classification Search
CPC .... B01D 53/94; B01J 35/04; H05B 2203/017; H05B 3/16; F01N 3/2828; F01N 3/2026; F01N 3/28; F01N 3/20
See application file for complete search history.

(56) References Cited

U.S. PATENT DOCUMENTS 5,388,177 A * 2/1995 Ono .......................... A61L 9/03
219/553
6,328,936 B1 * 12/2001 Roychoudhury ...... B01D 53/94
422/174

(Continued)

FOREIGN PATENT DOCUMENTS

JP 2010-229976 A1 10/2010
JP 2013-238116 A1 11/2013
(Continued)

*Primary Examiner* — Timothy C Vanoy
(74) *Attorney, Agent, or Firm* — Burr & Brown, PLLC

(57) ABSTRACT

There is provided a honeycomb type heating device including: a pillar-shaped honeycomb substrate having a partition wall defining a plurality of cells extending from one end face to the other end face and a circumferential wall surrounding the partition wall; a plurality of heaters adjacently arranged on a circumferential face that is an outside surface of the circumferential wall in a circumferential direction of the circumferential face; and intermediate members interposed between the circumferential face of the honeycomb substrate and the plurality of heaters. The sum of areas of portions of the circumferential face covered with the intermediate members between the circumferential face of the honeycomb substrate and the plurality of heaters is 20 to 100% of the sum of areas of portions of the circumferential face covered with the plurality of heaters.

19 Claims, 8 Drawing Sheets

(51) Int. Cl.
  *H05B 3/16*   (2006.01)
  *F01N 3/20*   (2006.01)
  *F01N 3/28*   (2006.01)

(52) U.S. Cl.
  CPC ......... H05B 3/16 (2013.01); H05B 2203/017 (2013.01)

(56) References Cited

U.S. PATENT DOCUMENTS

| | | | | |
|---|---|---|---|---|
| 9,820,337 | B2* | 11/2017 | Sakuma | H05B 3/0004 |
| 9,835,063 | B2* | 12/2017 | Hosoi | F01N 3/0222 |
| 2013/0036719 | A1* | 2/2013 | Noguchi | C04B 35/565 |
| | | | | 55/523 |
| 2013/0306623 | A1* | 11/2013 | Kumagai | F01N 3/2026 |
| | | | | 219/534 |
| 2014/0311134 | A1* | 10/2014 | Yoshioka | F01N 3/2026 |
| | | | | 60/286 |
| 2015/0086436 | A1* | 3/2015 | Mutsuda | F01N 3/2871 |
| | | | | 422/173 |
| 2015/0290584 | A1* | 10/2015 | Kasahara | B01D 53/94 |
| | | | | 422/174 |
| 2015/0292386 | A1* | 10/2015 | Nishigaya | F01N 3/2026 |
| | | | | 60/320 |
| 2017/0122180 | A1* | 5/2017 | Lee | B01D 53/94 |

FOREIGN PATENT DOCUMENTS

| | | | | | |
|---|---|---|---|---|---|
| JP | | 2012111071 | A1* | 7/2014 | ........... F01N 3/2026 |
| JP | | 5626371 | B2* | 11/2014 | ........... F01N 3/2026 |

* cited by examiner

HONEYCOMB TYPE HEATING DEVICE, METHOD OF USING THE SAME, AND METHOD OF MANUFACTURING THE SAME

The present application is an application based on JP 2016-049311 filed on Mar. 14, 2016 with Japan Patent Office, the entire contents of which are incorporated herein by reference.

BACKGROUND OF THE INVENTION

Field of the Invention

The present invention relates to a honeycomb type heating device for raising temperature of a catalyst for purifying exhaust gas up to the active temperature of the catalyst at an early stage, the honeycomb type heating device being provided in an exhaust path of the exhaust gas emitted from an engine of, for example, a motor vehicle, a method of using the honeycomb type heating device, and a method of manufacturing the honeycomb type heating device.

Description of the Related Art

A catalyst loaded into a honeycomb structure is conventionally used for purification treatment of a toxic substance, such as HC, CO, or $NO_x$, included in exhaust gas emitted from an engine of, for example, a motor vehicle. When the catalyst loaded into the honeycomb structure treats the exhaust gas in this manner, it is required to raise temperature of the catalyst up to the active temperature of the catalyst. However, when the engine starts, there is a problem that the exhaust gas is insufficiently purified because the catalyst has not reached the active temperature. Particularly, since the traveling by a plug-in hybrid vehicle (PHEV) or a hybrid vehicle (HV) includes traveling by only a motor, the frequency of starting the engine is low and the temperature of the catalyst is low when the engine starts. As a result, the performance of purifying the exhaust gas easily degrades immediately after the engine starts.

In order to solve the above problem, there has been proposed an electrically heated catalyst (EHC) in which an electrode is disposed in a honeycomb structure formed by conductive ceramics and then energization causes the honeycomb structure itself to generate heat to make it possible to raise temperature up to an active temperature before an engine starts (see Patent Document 1).

There has been proposed another heating device in which a tubular resistance heating type heater is arranged so as to surround a circumferential wall of a honeycomb structure and heats a wall surface of the circumferential wall of the honeycomb structure to transmit the heat to an inner cell structure (see Patent Document 2).

[Patent Document 1] JP-A-2010-229976
[Patent Document 2] JP-A-2013-238116

SUMMARY OF THE INVENTION

However, in a method of causing the honeycomb structure itself to generate heat by energization, a path of an electric current flowing inside the honeycomb structure varies to cause decrease of temperature and variation of temperature distribution by just a slight crack that occurs in the honeycomb structure due to, for example, vibrations. Thus, durability is not sufficient.

Meanwhile, in a method of arranging a tubular resistance heating type heater to surround the circumferential wall of a honeycomb structure, since the honeycomb structure is heated by the external heater, temperature variation of honeycomb structure by a slight crack that occurs in the honeycomb structure due to, for example, vibrations is small. However, the tubular heater is easily damaged due to thermal stress. In the heating of the monolithic resistance heating type heater (a monolithic structure), when the heater is damaged and then energization cannot be performed, the entire honeycomb structure is not heated at all. Due to a gap present between the heater and the honeycomb structure and minute unevenness of a surface of a circumferential wall (a circumferential surface) of the honeycomb structure, thermal resistance between the heater and the surface of the circumferential wall of the honeycomb structure is large. Thus, it is difficult to transmit the heat from the heater to the honeycomb structure, efficiently.

The present invention has been made in consideration of the above conventional reasons. That is, an object of the present invention is to provide a honeycomb type heating device capable of heating, even when heaters are partially damaged, and transmitting the heat from the heaters to a honeycomb structure (a honeycomb substrate), efficiently, a method of using the honeycomb type heating device, and a method of manufacturing the honeycomb type heating device.

In order to achieve the object, according to an embodiment of the present invention, the following honeycomb type heating device, method of using the honeycomb type heating device, and method of manufacturing the honeycomb type heating device are provided.

According to a first aspect of the present invention, a honeycomb type heating device is provided including: a pillar-shaped honeycomb substrate having a partition wall defining a plurality of cells extending from one end face to the other end face and a circumferential wall surrounding the partition wall; a plurality of heaters adjacently arranged on a circumferential face that is an outside surface of the circumferential wall in a circumferential direction of the circumferential face; and intermediate members interposed between the circumferential face of the honeycomb substrate and the plurality of heaters, wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters.

According to a second aspect of the present invention, the honeycomb type heating device according to the first aspect is provided, wherein a thermal conductivity of at least a portion of each of the intermediate members is 1 W/m·K or more.

According to a third aspect of the present invention, the honeycomb type heating device according to the first or second aspects is provided, wherein a Young's modulus of each of the intermediate members is 0.01 to 30 GPa.

According to a fourth aspect of the present invention, the honeycomb type heating device according to any one of the first to third aspects is provided, wherein a porosity of each of the intermediate members is 0 to 70%.

According to a fifth aspect of the present invention, the honeycomb type heating device according to any one of the first to fourth aspects is provided, wherein each of the intermediate members includes inorganic particles and an inorganic bonding agent.

According to a sixth aspect of the present invention, the honeycomb type heating device according to the fifth aspect is provided, wherein an average particle diameter of the inorganic particles is 1 to 100 μm.

According to a seventh aspect of the present invention, the honeycomb type heating device according to any one of the first to sixth aspects is provided, wherein each of the plurality of heaters is a resistance heating type heater that generates heat due to energization.

According to an eighth aspect of the present invention, the honeycomb type heating device according to any one of the first to sixth aspects is provided, wherein each of the plurality of heaters is a reaction heat type heater that generates heat due to chemical reaction.

According to a ninth aspect of the present invention, the honeycomb type heating device according to the seventh aspect is provided, wherein the plurality of heaters are electrically coupled in series or in parallel and has electric resistance endurable against application of a high voltage of 200 V or more.

According to a tenth aspect of the present invention, the honeycomb type heating device according to the seventh to ninth aspects is provided, wherein each of the plurality of heaters has an insulating function for preventing an electric current from flowing from each of the plurality of heaters to the honeycomb substrate.

According to an eleventh aspect of the present invention, the honeycomb type heating device according to any one of the first to tenth aspects is provided, wherein the honeycomb substrate is formed by a ceramic material having a thermal conductivity of 20 W/m·K or more.

According to a twelfth aspect of the present invention, the honeycomb type heating device according to any one of the first to eleventh aspects is provided, wherein the thickness of the circumferential wall is thicker than the thickness of the partition wall.

According to a thirteenth aspect of the present invention, the honeycomb type heating device according to the first to twelfth aspects is provided, wherein stress relief is formed on the honeycomb substrate.

According to a fourteenth aspect of the present invention, the honeycomb type heating device according to any one of the first to thirteenth aspects is provided, wherein a catalyst for purifying exhaust gas is loaded into the honeycomb substrate.

According to a fifteenth aspect of the present invention, the honeycomb type heating device according to the fourteenth aspect is provided, wherein the honeycomb type heating device is provided in an exhaust path of exhaust gas emitted form an engine, and used for causing each of the heaters to generate heat to raise temperature of the honeycomb substrate loaded with the catalyst for purifying the exhaust gas up to a catalyst active temperature of the catalyst or more before the engine starts.

According to a sixteenth aspect of the present invention, a canned honeycomb type heating device being formed by the honeycomb type heating device according to any one of the first to fifteenth aspects is provided that is housed in a tubular canning case.

According to a seventeenth aspect of the present invention, a method of using a honeycomb type heating device is provided, including: providing the honeycomb type heating device in an exhaust path of exhaust gas emitted from an engine; and raising temperature of a pillar-shaped honeycomb substrate up to a catalyst active temperature of a catalyst or more by causing each of a plurality of heaters to generate heat before the engine starts, the honeycomb type heating device including: the pillar-shaped honeycomb substrate having a partition wall defining a plurality of cells extending from one end face to the other end face and a circumferential wall surrounding the partition wall; the plurality of heaters adjacently arranged on a circumferential face that is an outside surface of the circumferential wall in a circumferential direction of the circumferential face; and intermediate members interposed between the circumferential face of the honeycomb substrate and the plurality of heaters, wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters, and wherein the catalyst for purifying the exhaust gas is loaded into the honeycomb substrate.

According to an eighteenth aspect of the present invention, a method of manufacturing a honeycomb type heating device is provided, including: applying paste for forming intermediate members, including SiC particles and colloidal silica, to portions of a circumferential face of a pillar-shaped honeycomb substrate on which each of a plurality of heaters is arranged and/or a face of each of the plurality of heaters facing the circumferential face of the honeycomb substrate; arranging the plurality of heaters adjacently, with the paste interposed between the plurality of heaters and the circumferential face, on the circumferential face in a circumferential direction of the circumferential face of the honeycomb substrate after the applying; and forming the intermediate members from the paste by heating and drying the paste after the arranging, the honeycomb type heating device including: the pillar-shaped honeycomb substrate having a partition wall defining a plurality of cells extending from one end face to the other end face and a circumferential wall surrounding the partition wall; the plurality of heaters adjacently arranged on the circumferential face that is an outside surface of the circumferential wall in the circumferential direction of the circumferential face; and the intermediate members interposed between the circumferential face of the honeycomb substrate and the plurality of heaters, wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters.

According to a nineteenth aspect of the present invention, the method of manufacturing the honeycomb type heating device according to the eighteenth aspect is provided, further including loading a catalyst for purifying exhaust gas into the partition wall of the honeycomb substrate before the applying.

In the honeycomb type heating device according to the present invention, the intermediate members interposed between the circumferential face of the honeycomb substrate and the plurality of heaters fills a gap between the plurality of heaters and the honeycomb substrate, and additionally absorbs minute unevenness of the surface of the circumferential wall of the honeycomb substrate. As a result, thermal resistance between the plurality of heaters and the surface of the circumferential wall of the honeycomb substrate decreases so that the heat of the heaters can be efficiently transmitted to the honeycomb substrate. In the honeycomb type heating device according to the present invention, the honeycomb substrate itself does not generate heat but is heated by the plurality of heaters attached to the honeycomb substrate. Thus, even when a slight crack occurs in the honeycomb substrate, temperature variation of the honeycomb substrate is small. In the honeycomb type heating device according to the present invention, the plurality of heaters heats the honeycomb substrate. Thus, even when a heater of the heaters is damaged and does not generate the heat, the remaining heaters that are capable of generating the heat can heat the honeycomb substrate. The plurality of heaters are adjacent to each other in a circumferential direction of the circumferential face of the honeycomb substrate, but the plurality of heaters has a divided structure so as to be separated from each other. As a result, a large thermal stress barely occurs in each of the heaters and the heaters are barely damaged.

The canned honeycomb type heating device according to the present invention includes the honeycomb type heating device according to the present invention already housed in the canning case. Thus, the canned honeycomb type heating device can be provided in the exhaust path of the exhaust gas so as to be used as it is.

Furthermore, in the method of using the honeycomb type heating device according to the present invention, each of the heaters is caused to generate heat before the engine starts, to raise temperature of the honeycomb substrate loaded with the catalyst for purifying the exhaust gas up to the catalyst active temperature of the catalyst or more. As a result, the catalyst that has been activated can efficiently purify a toxic component included in the exhaust gas immediately after the engine starts.

Furthermore, in the method of manufacturing the honeycomb type heating device according to the present invention, the honeycomb type heating device according to the present invention, having an excellent effect described above, can be manufactured.

DETAILED DESCRIPTION OF THE PRESENT INVENTION

The present invention will be described below based on a specific embodiment. However, the present invention should not be interpreted as limited to the embodiment, and alterations and improvements of the design may be appropriately added without departing from the scope of the spirit of the present invention, based on a general knowledge of a person skilled in the art.

Figure 1:
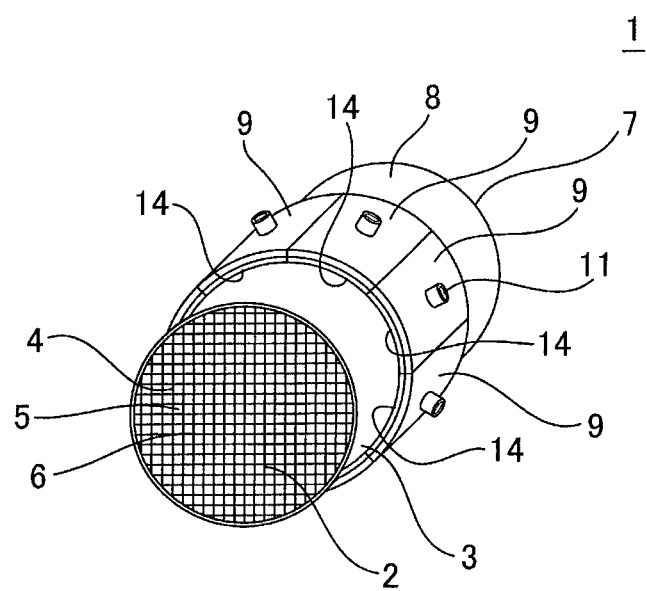
FIG. 1 is a schematic perspective view showing an exemplary honeycomb type heating device according to an embodiment of the present invention.
Figure 2:
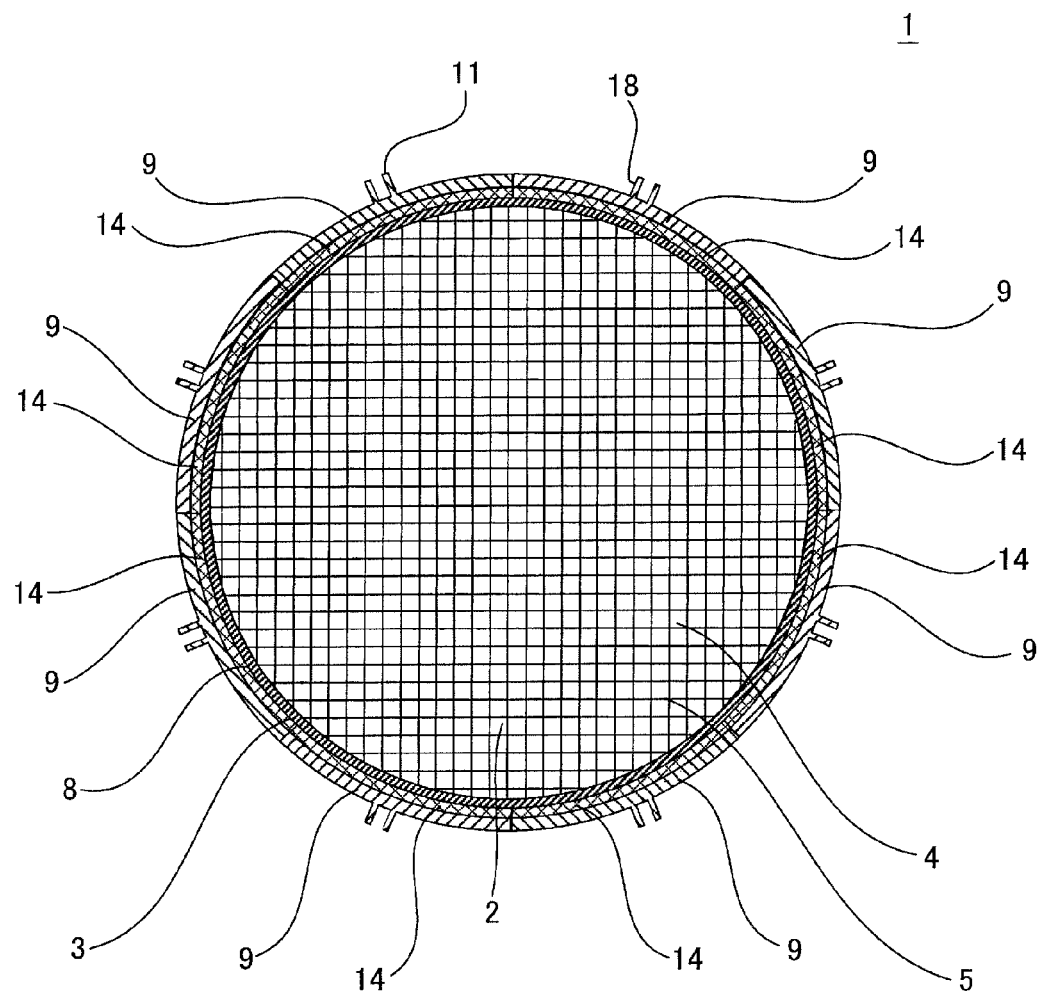
FIG. 2 is a schematic sectional view showing a section of the exemplary honeycomb type heating device according to the present invention, orthogonal to a length direction of the device (an axial direction)
Figure 3:
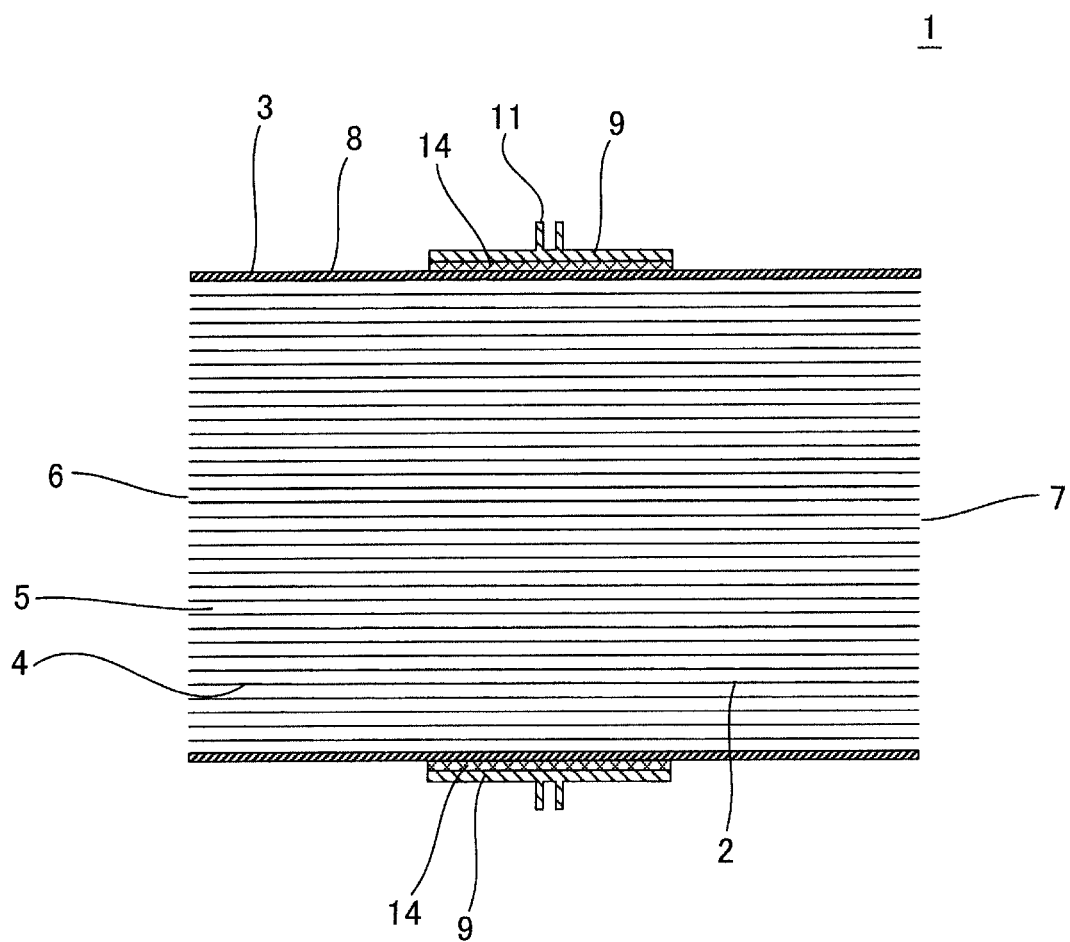
FIG. 3 is a schematic sectional view showing a section of the exemplary honeycomb type heating device according to the present invention, parallel to the length direction of the device (the axial direction)

(1) Honeycomb Type Heating Device:

FIG. 1 is a schematic perspective view showing an exemplary honeycomb type heating device according to the present invention. FIG. 2 is a schematic sectional view showing a section of the honeycomb type heating device according to the present invention, orthogonal to a length direction of the device (an axial direction). FIG. 3 is a schematic sectional view showing a section of the exemplary honeycomb type heating device according to the present invention, parallel to the length direction of the device (the axial direction). As shown in FIGS. 1 to 3, the honeycomb type heating device 1 according to the present invention, includes a honeycomb substrate 2, a plurality of heaters 9, and intermediate members 14.

The honeycomb substrate 2 is pillar-shaped, and has a partition wall 4 defining a plurality of cells 5 extending from one end face 6 to the other end face 7 and a circumferential wall 3 surrounding the partition wall 4. The cells 5 each act as a channel of a fluid, such as exhaust gas. The plurality of heaters 9 are adjacently arranged on a circumferential face 8 in a circumferential direction of the circumferential face 8 being an outside surface of the circumferential wall 3 of the honeycomb substrate 2 (a face exposed to the outside). Each of the intermediate members 14 is arranged in a state of being interposed between the circumferential face 8 of the honeycomb substrate 2 and the plurality of heaters 9.

According to the embodiment shown in FIGS. 1 to 3, each of the heaters 9 is a resistance heating type heater that generates heat due to energization. According to the present embodiment, each of the heaters 9 includes an electrode terminal protrusion 11 for connecting an electric line with each of the heaters 9, provided thereto. The electrode terminal protrusion 11 is formed to be tubular, and includes, inside the tubular form, an electrode terminal of a corresponding heater 9 arranged inside. A power supply energizes the corresponding heater 9 through the electric line connected with the electrode terminal. Note that, the type of the heaters that can be used in the embodiment of the present invention, is not limited to the resistance heating type heater. For example, a reaction heat type heater that generates heat using reaction heat occurring due to a chemical reaction may be used instead of the resistance heating type heater. Examples of the reaction heat type heater include a chemico thermal storage unit disclosed in JP-A-2014-111913, the chemico thermal storage unit reacting $NH_3$ with $MgCl_2$, $CaCl_2$, $NiCl_2$, $ZnCl_2$, or $SrCl_2$, for example, so as to generate heat using heat generated by the reaction.

In the honeycomb type heating device 1 according to the present invention, each of the intermediate members 14 is interposed between the circumferential face 8 of the honeycomb substrate 2 and the plurality of heaters 9 so as to fill a gap between the plurality of heaters 9 and the honeycomb substrate 2 and additionally absorb minute unevenness of the circumferential face 8 of the honeycomb substrate 2. As a result, thermal resistance between the plurality of heaters 9 and the circumferential face 8 of the honeycomb substrate 2 decreases so that the heat of the plurality of heaters 9 can be efficiently transmitted to the honeycomb substrate 2. At least a portion of each of the intermediate members 14 preferably has a thermal conductivity of 1 W/m·K or more, more preferably, a thermal conductivity of 1.5 W/m·K or more, and, furthermore preferably, a thermal conductivity of 2

W/m·K or more. Each of the intermediate members 14 has the above high thermal conductivity so that the heat of the plurality of heaters 9 can be efficiently transmitted to the honeycomb substrate 2. The upper limit of the thermal conductivity of at least the portion of each of the intermediate members 14 is not particularly limited. Note that, the thermal conductivity of the honeycomb substrate 2 is typically approximately 150 W/m·K at a maximum and thus, the performance of heat transfer is not expected to improve considerably even when the thermal conductivity of each of the intermediate members 14 increases higher than the thermal conductivity of the honeycomb substrate 2. Therefore, the upper limit of the thermal conductivity of each of the intermediate members 14 is preferably approximately 150 W/m·K. Note that, according to the present invention, the thermal conductivity of the intermediate member 14 is a value obtained by cutting a disk-shaped sample for measurement, having a size of a diameter of 5 mm×a thickness of 1 mm, from the intermediate member 14 and measuring a thermal conductivity of the disk-shaped sample based on a method compliant with JIS R 1611.

In the honeycomb type heating device 1 according to the present invention, the plurality of heaters 9 heats the honeycomb substrate 2. Thus, even when a part of the heaters 9 is damaged and does not generate the heat, the remaining heaters 9 that is capable of generating the heat can heat the honeycomb substrate 2. Note that, since in the honeycomb type heating device 1 according to the present invention, the honeycomb substrate 2 itself does not generate heat but is heated by the plurality of heaters 9 attached to the honeycomb substrate 2, temperature variation of the honeycomb substrate 2 is small even when a slight crack occurs in the honeycomb substrate 2.

Furthermore, the plurality of heaters 9 used in the honeycomb type heating device 1 according to the present invention, is adjacent to each other in the circumferential direction of the circumferential face 8 of the honeycomb substrate 2, but the plurality of heaters 9 has a divided structure so as to be separated from each other. As a result, a large thermal stress barely occurs in each of the heaters 9. Accordingly, the plurality of heaters 9 have less damage due to the thermal stress than the tubular monolithic heater disclosed in Patent Document 2 and have superior durability. Note that, according to the present invention, "adjacency" means not only a state where adjacent heaters are in contact with each other but also a state where the heaters are adjacent to each other at a certain interval. In the honeycomb type heating device 1 according to the present invention, in view of heating efficiency, at least some of the heaters 9 adjacent are preferably in direct contact with each other and, more preferably, all the heaters 9 adjacent are in direct contact with each other.

In the honeycomb type heating device 1 according to the present invention, the sum of areas of portions of the circumferential face 8 covered with the intermediate members 14 between the circumferential face 8 of the honeycomb substrate 2 and the plurality of heaters 9, is 20 to 100% of the sum of areas of portions of the circumferential face 8 covered with the plurality of heaters 9. In the following descriptions, "the sum of the areas of the portions of the circumferential face 8 covered with the intermediate members 14 between the circumferential face 8 of the honeycomb substrate 2 and the plurality of heaters 9" may be referred to as "an intermediate member installation area". "The sum of the areas of the portions of the circumferential face 8 covered with the plurality of heaters 9" may be referred to as "a heater installation area". The intermediate member installation area is preferably 50 to 100% of the heater installation area, and, particularly preferably, 80 to 100% of the heater installation area. When the rate of the intermediate member installation area with respect to the heater installation area is in the above range, there is remarkably realized an effect that heat transfer improves due to each of the intermediate members 14 interposed between the circumferential face 8 of the honeycomb substrate 2 and the plurality of heaters 9. When the intermediate member installation area is less than 20% of the heater installation area, there may not be sufficiently realized an effect that the heat transfer improves due to each of the intermediate members 14 interposed between the circumferential face 8 of the honeycomb substrate 2 and the plurality of heaters 9.

A Young's modulus of each of the intermediate members 14 is preferably 0.01 to 30 GPa, more preferably, 0.1 to 20 GPa, and, particularly preferably, 0.1 to 10 GPa. When the Young's modulus of each of the intermediate members 14 is in the above range, each of the intermediate members 14 easily adheres to the circumferential face 8 of the honeycomb substrate 2 and the heaters 9 so that the thermal resistance between the plurality of heaters 9 and the circumferential face 8 of the honeycomb substrate 2 can be sufficiently made to be small. Note that, according to the present invention, the Young's modulus of each of the intermediate members 14 is a value measured by a bending resonance method compliant with JIS R 1602. A sample for measurement (a test piece) was prepared by the following method. First, a bulk body was prepared by using a raw material of which each of the intermediate members 14 was formed. Then, a piece having a size of 3 mm×4 mm×40 mm was cut off from the bulk body so as to be the sample for the measurement.

A porosity of each of the intermediate members 14 is preferably 0 to 70%, more preferably, 5 to 60%, and, particularly preferably, 10 to 50%. When the porosity of each of the intermediate members 14 is in the above range, strength necessary for each of the intermediate members 14 is easily secured and additionally a high thermal conductivity is easily obtained. Note that, according to the present invention, the porosity of each of the intermediate members 14 is a value measured by an Archimedes method.

The thickness of each of the intermediate members 14 is preferably 100 to 2000 μm, more preferably, 100 to 1000 μm, and, particularly preferably, 100 to 500 μm. When the thickness of each of the intermediate members 14 is in the above range, the gap between the plurality of heaters 9 and the honeycomb substrate 2 is easily filled with the intermediate members 14. As a result, the thermal resistance between the plurality of heaters 9 and the circumferential face 8 of the honeycomb substrate 2 easily decreases. The efficiency of the heat transfer can be prevented from decreasing due to an excessive thickness of each of the intermediate members 14.

In the honeycomb type heating device 1 according to the present invention, each of the intermediate members 14 preferably includes inorganic particles and an inorganic bonding agent. Each of the intermediate members 14 can be formed by using paste including the inorganic particles and the inorganic bonding agent so as to adhere to the circumferential face 8 of the honeycomb substrate 2 and the heaters 9, easily. The paste is dried so as to solidify and bond the circumferential face 8 of the honeycomb substrate 2 and the heaters 9 so that the heaters 9 are easily fixed onto the circumferential face 8 of the honeycomb substrate 2.

Silicon carbide particles and the like can be preferably used as the inorganic particles included in each of the intermediate members 14. For example, silica and the like can be preferably used as the inorganic bonding agent included in each of the intermediate members 14. The intermediate members 14 having a high thermal conductivity can be easily obtained by including the inorganic particles and the inorganic bonding agent in intermediate members 14.

The average particle diameter of the inorganic particles included in each of the intermediate members 14 is preferably 1 to 100 μm, more preferably, 3 to 50 μm, and particularly preferably, 5 to 40 μm. When the average particle diameter of the inorganic particles included in each of the intermediate members 14 is in the above range, the paste easily adheres to the circumferential face 8 of the honeycomb substrate 2 and the heaters 9 in forming each of the intermediate members 14 by using the paste. Note that, according to the present invention, the average particle diameter of the inorganic particles is a value measured by a laser diffraction method The property of each of the intermediate members 14 is not particularly limited. Specific examples of each of the intermediate members 14 that can be used in the honeycomb type heating device 1 according to the present invention, include a sheet formed by carbon, silicon or the like, and a mat formed by an inorganic fiber such as stainless steel, copper, nickel or the like, other than the member including the inorganic particles and the inorganic bonding agent as explained above. A mat obtained by impregnating the paste into the mat described above, may be used as each of the intermediate members 14, the mat retaining the inorganic particles and the inorganic bonding agent between the inorganic fibers.

Figure 7:
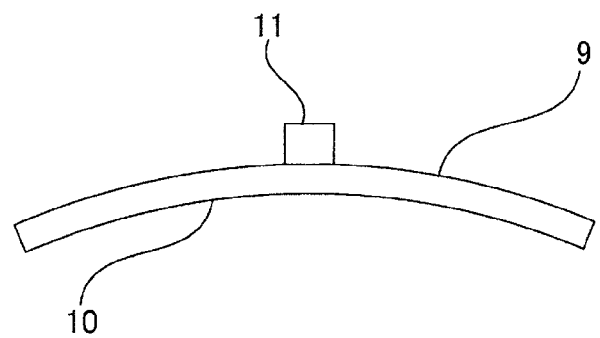
FIG. 7 is a schematic side view showing an exemplary heater used in the honeycomb type heating device according to the present invention.

The number of the heaters 9 used in the honeycomb type heating device 1 according to the present invention may be at least two, but the upper limit number is not particularly limited. The number of the heaters 9 is preferably approximately 2 to 16 in consideration of, for example, simple assembly of the device. When a honeycomb substrate having a curved circumferential face (for example, a round pillar-shaped honeycomb substrate) is used, as shown in FIG. 7, the heaters 9 each preferably include a concave arc-shaped face 10 formed thereon, the concave arc-shaped face 10 being curved substantially the same as the circumferential face of the honeycomb substrate. The concave arc-shaped face 10 faces the circumferential face 8 through each of the intermediate members 14. By forming the above face 10, a large gap between the heaters 9 and the circumferential face 8 barely occurs when the heaters 9 are arranged on the circumferential face 8 of the honeycomb substrate 2.

The honeycomb type heating device 1 according to the present invention, preferably has portions in which the heaters 9 cover 50% or more of the circumferential face 8 in a circumferential direction of the honeycomb substrate 2. Furthermore, in the honeycomb type heating device 1 according to the present invention, the "portions in which the heaters 9 cover 50% or more of the circumferential face 8 in the circumferential direction of the honeycomb substrate 2" are preferably present over 60% or more of the entire length of the honeycomb substrate 2 in an axial direction of the honeycomb substrate 2. The honeycomb substrate 2 is easily heated up to a target temperature by setting the regions covered with the heaters 9 on the circumferential face 8 of the honeycomb substrate 2 as described above.

When the honeycomb type heating device 1 according to the present invention is mounted on a motor vehicle so as to be used, typically, a power supply used in an electrical system of the motor vehicle, for example, a power supply having a high voltage such as 200 V, is commonly used to energize the heaters 9. Accordingly, in the honeycomb type heating device 1 according to the present invention, when the resistance heating type heater is used for each of the heaters 9, preferably, the plurality of heaters 9 are electrically coupled in series or in parallel and have electric resistance endurable against application of a high voltage of 200 V or more. Here, "endurable against application of a high voltage of 200 V or more" specifically means that an electric current of approximately 25 A can flow when a voltage of 200 V is applied.

Note that, since a metallic heater has low electric resistance, when the power supply having the above high voltage is used, an electric current excessively flows so that a power supply circuit may be damaged. Therefore, in the honeycomb type heating device 1 according to the present invention, a ceramic heater including a heating resistor embedded inside a ceramic member is preferably used. Examples of a constituent material of the ceramic member that can be preferably used, include beryllia, aluminum nitride, silicon nitride, and alumina. Examples of a constituent material of the heating resistor that can be preferably used, include silver (Ag), aluminum (Al), gold (Au), beryllium (Be), copper (Cu), magnesium (Mg), molybdenum (Mo), tungsten (W), ruthenium (Ru), and platinum (Pt). The constituent material of the heating resistor may be a compound, and in this case, a nitride, a carbide, a boride, or a silicide of each of zirconium (Zr), titanium (Ti), niobium (Nb), hafnium (Hf), tantalum (Ta), molybdenum (Mo), and tungsten (W) can be preferably used.

Figure 8:
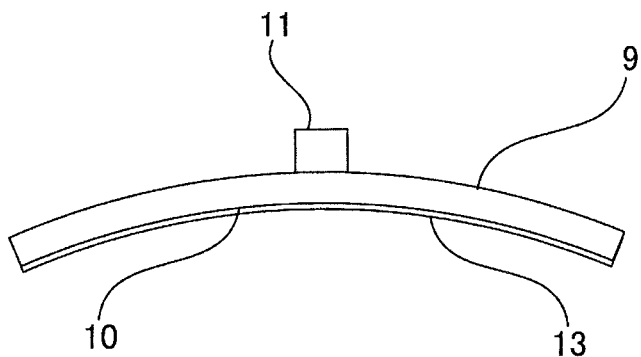
FIG. 8 is a schematic side view showing another exemplary heater used in the honeycomb type heating device according to the present invention.

When the heaters 9 used in the honeycomb type heating device 1 according to the present invention, are the resistance heating type heaters and the honeycomb substrate 2 is formed of a conductive material, each of the heaters 9 preferably has an insulating function for preventing an electric current from flowing from each of the heaters 9 to the honeycomb substrate 2 so as to realize a short circuit. When each of the heaters 9 has the insulating function, a short circuit (a short) due to the flow of the current from each of the heaters 9 to the honeycomb substrate 2, can be prevented even in a case where the honeycomb substrate 2 is formed of the conductive material. An exemplary method of applying the insulting function to each of the heaters 9, for example, as shown in FIG. 8, includes disposing an insulating material 13 on the face 10 of each of the heaters 9 facing the circumferential face 8 of the honeycomb substrate 2. Examples of a material of the insulating material 13 that can be preferably used, include silicon nitride and alumina.

Figure 10:
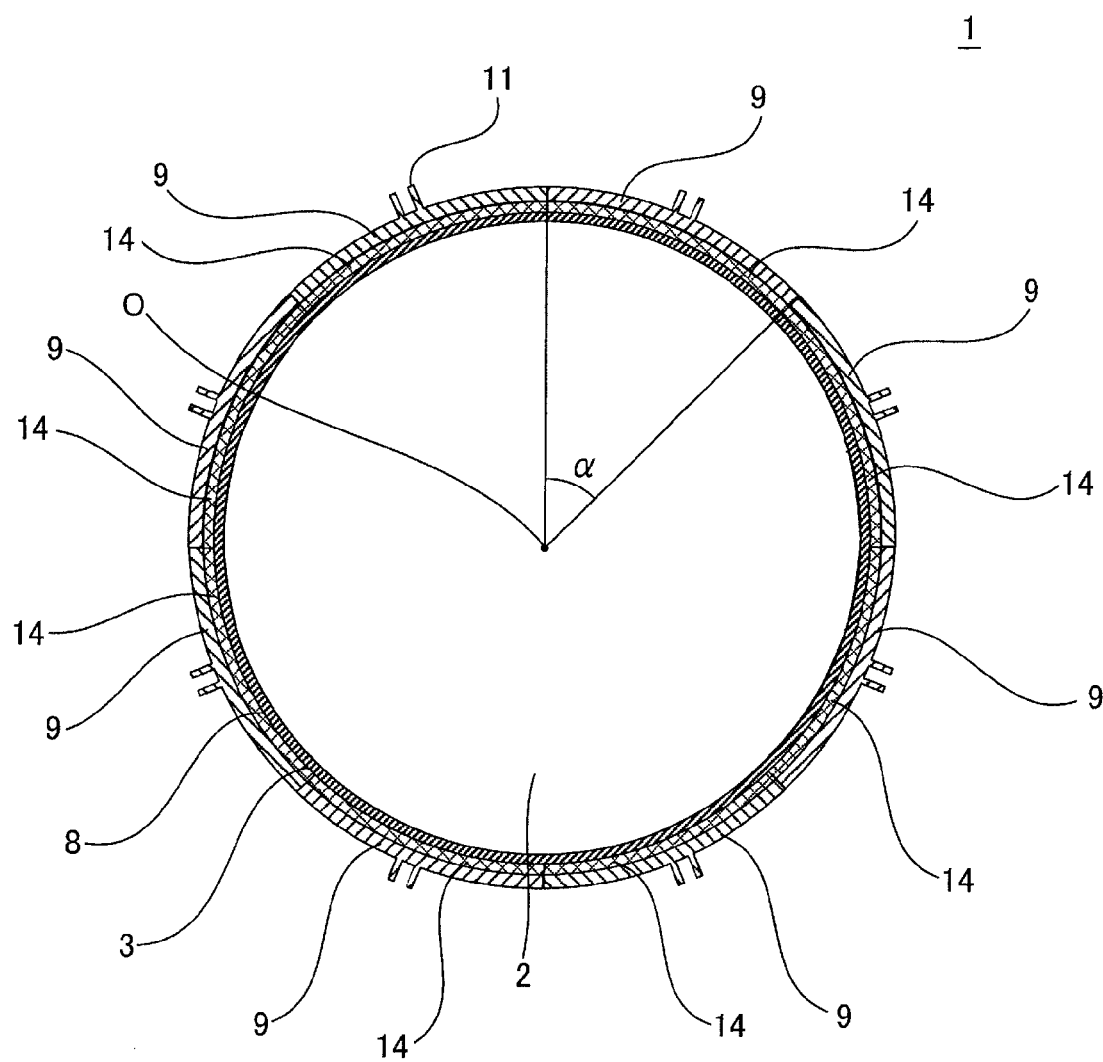
FIG. 10 is a schematic sectional view for describing the central angle of a heater.

In the honeycomb type heating device 1 according to the present invention, the central angle α of each of the heaters 9 arranged on the circumferential face 8 of the honeycomb substrate 2 is preferably 180° or less in a section of the honeycomb substrate 2 orthogonal to a length direction (the axial direction). The central angle α is more preferably 10 to 180° and, furthermore preferably, 10 to 100°. Here, as shown in FIG. 10, "the central angle α of each of the heaters 9" is an angle formed with two line segments connecting both ends of each of the heaters 9 and the center O of the honeycomb substrate 2 in the section of the honeycomb substrate 2 orthogonal to the length direction. As shown in FIG. 10, "the center O of the honeycomb substrate 2" means the center of a circle when the circumferential shape of the section of the honeycomb substrate 2 orthogonal to the length direction is circular. When the circumferential shape of the section of the honeycomb substrate 2 orthogonal to the length direction has a shape except circles, "the center O of the honeycomb substrate 2" means the center of a maximum circle included in the section. When the central angle α of each of the heaters 9 exceeds 180°, a large gap easily occurs between the honeycomb substrate 2 and each of the heaters 9. When the central angle a of each of the heaters 9 is less than 10°, a range in which one heater 9 can cover the circumferential face 8, narrows so that the number of the heaters 9 necessary for heating the honeycomb substrate 2 up to the target temperature may excessively increase. Note that, the partition wall 4 of the honeycomb substrate 2 is omitted in FIG. 10.

The honeycomb substrate 2 used in the honeycomb type heating device 1 according to the present invention, preferably includes a ceramic material having a thermal conductivity of 20 W/m·K or more and, more preferably, a ceramic material having a thermal conductivity of 50 W/m·K or more. When the honeycomb substrate 2 includes the material having the above high conductivity, the heat of the heaters 9 can be efficiently transmitted to the honeycomb substrate 2 and additionally the entire honeycomb substrate 2 can be uniformly heated. Note that, according to the present invention, the thermal conductivity of the honeycomb substrate 2 is a value obtained by cutting a disk-shaped sample for measurement, having a size of a diameter of 5 mm×a thickness of 1 mm, from the honeycomb substrate 2 and measuring a thermal conductivity of the disk-shaped sample based on a method compliant with JIS R 1611.

A constituent material of the honeycomb substrate 2 preferably includes, as a main component, silicon carbide (SiC) having an excellent heat conductivity, thermal resistance, and corrosion resistance. Note that, "the main component" referred to here means a material in an amount of 50% by mass or more of the entire material. More specific examples of the constituent material preferably include an Si—SiC composite, an (Si+Al)—SiC composite, metal complex SiC, recrystallized SiC, $Si_3N_4$, and SiC. Note that, in a case where the porosity of the honeycomb substrate 2 is excessively high, a high thermal conductivity is not obtained in some cases even when the above materials are used. Thus, the honeycomb substrate 2 preferably is dense (a porosity of 20% or less). The Si—SiC composite is densely formed by impregnating metal Si into SiC and indicates a high thermal conductivity and thermal resistance. Thus, the Si—SiC composite is particularly preferable as the constituent material of the honeycomb substrate 2.

The thickness of the circumferential wall 3 of the honeycomb substrate 2 is preferably thicker than the thickness of the partition wall 4. When the thickness of the circumferential wall 3 is thicker than the thickness of the partition wall 4 as described above, the strength of the honeycomb substrate 2 can improve and the strength necessary for the honeycomb substrate 2 is easily secured.

The thickness of the circumferential wall 3 of the honeycomb substrate 2 is not particularly limited, but is preferably 0.15 to 2.0 mm, and more preferably 0.3 to 1.0 mm. When the thickness of the circumferential wall 3 is 0.15 mm or more, the mechanical strength of the honeycomb substrate 2 becomes sufficient and the honeycomb substrate 2 can be prevented from being damaged due to a shock or the thermal stress. When the thickness of the circumferential wall 3 is 2.0 mm or less, the heat of the heaters 9 can be efficiently transmitted to the partition wall 4 through the circumferential wall 3.

In addition, the thickness of the partition wall 4 of the honeycomb substrate 2 is not particularly limited, but is preferably 0.1 to 1 mm, and more preferably 0.2 to 0.5 mm. When the thickness of the partition wall 4 is 0.1 mm or more, the mechanical strength of the honeycomb substrate 2 becomes sufficient and the honeycomb substrate 2 can be prevented from being damaged due to the shock and the thermal stress. When the thickness of the partition wall 4 is 1 mm or less, a pressure loss can be prevented from increasing when the fluid flows inside the cells 5.

The cell density of the honeycomb substrate 2 (the number of the cells per unit cross section area) is not particularly limited, but is preferably in a range of 25 to 2000 cells/square inch (4 to 320 cells/cm$^2$). When the cell density is 25 cells/square inch (4 cells/cm$^2$) or more, the strength of the partition wall 4, furthermore, the strength of the honeycomb substrate 2 itself and an effective geometric surface area (GSA) can be sufficient. When the cell density is 2000 cells/square inch (320 cells/cm$^2$) or less, the pressure loss can be prevented from increasing when the fluid flows inside the cells 5.

The porosity of the honeycomb substrate 2 is preferably 20% or less and, more preferably, 10% or less. When the porosity of the honeycomb substrate 2 is in the above range, the strength necessary for the honeycomb substrate 2 is easily secured and additionally a high thermal conductivity easily occurs. Note that, according to the present invention, the porosity of the honeycomb substrate 2 is a value measured by the Archimedes method.

The shape (the outer shape) of the honeycomb substrate 2 is at least, but is not particularly limited as long as the shape is pillar-shaped, and can be, for example, round pillar-shaped, elliptical pillar-shaped, or polygonal pillar-shaped. The shape of each of the cells 5 in the section of the honeycomb substrate 2 orthogonal to the length direction (hereinafter, referred to as "a cell shape") also is not particularly limited, but is preferably a polygon such as a quadrangle, a hexagon, or an octagon, or a combination thereof, such as a combination of the quadrangle and the octagon.

The diameter of the section of the honeycomb substrate 2 orthogonal to the length direction (the diameter of a circle circumscribed with the section when the section has a shape except circles) is not particularly limited, but is preferably 300 mm or less and, more preferably 200 mm or less. When the diameter of the section of the honeycomb substrate 2 orthogonal to the length direction is in the above range, the heat of the heaters 9 can be efficiently transmitted to the partition wall 4 inside the honeycomb substrate 2.

Figure 9:
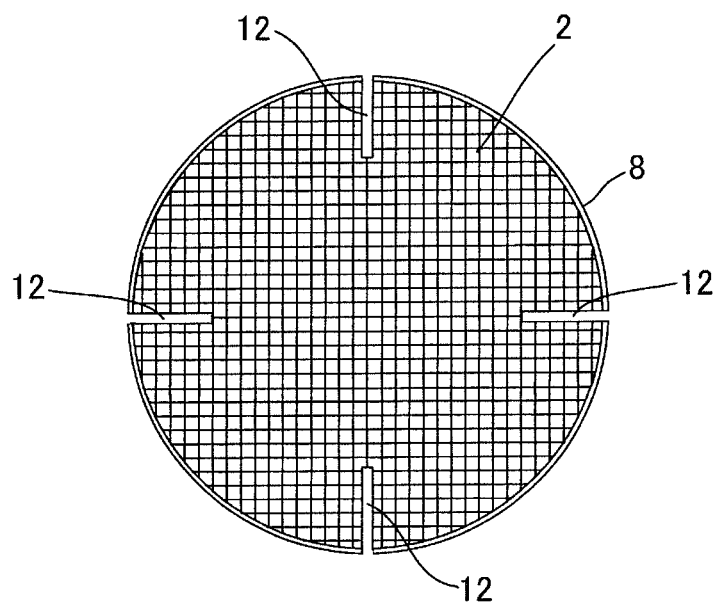
FIG. 9 is a schematic plane view showing an exemplary honeycomb substrate including stress relief formed thereon.

The honeycomb substrate 2 preferably includes stress relief formed thereon. When the stress relief is formed, stress relaxation can realized inside the honeycomb substrate 2. A representative of the stress relief is, for example, an slit 12 incised from the circumferential face 8 of the honeycomb substrate 2 in an inner direction as shown in FIG. 9. Note that, the stress relief is not limited to the above slit 12 and a known stress relief can be formed without departing from the scope of the present invention.

When the honeycomb type heating device 1 according to the present invention is provided in an exhaust path of exhaust gas emitted from an engine so as to be used, a catalyst for purifying the exhaust gas is preferably loaded into the partition wall 4 of the honeycomb substrate 2. When the catalyst is loaded into the partition wall 4 as described above, a toxic substance, such as CO, $NO_x$, or HC, in the exhaust gas can be converted into a nontoxic substance due to a catalytic reaction. Here, the type of the catalyst loaded into the partition wall 4 of the honeycomb substrate 2 is not particularly limited, but a precious metal is preferably used when the catalyst is used for motor-vehicle exhaust-gas purification, for example. Examples of the precious metal preferably include platinum, rhodium, palladium, and a combination thereof. The loading amount of the precious metal is preferably 0.1 to 5 g/L per unit volume of the honeycomb substrate 2.

Since the catalyst such as the precious metal should be loaded into the partition wall 4 in a high-dispersion state, it is preferable that the catalyst is first loaded into particles (carrier fine particles) of a heat resistant inorganic oxide having a large specific surface area, such as alumina, and then the catalyst that has been loaded into the particles is preferably loaded into the partition wall 4 of the honeycomb substrate 2 together with the particles.

The use and usage mode of the honeycomb type heating device 1 according to the present invention are not particularly limited, but the honeycomb type heating device 1 is preferably provided in an exhaust path of exhaust gas emitted from an engine so as to be used in view of effective application of the effect thereof. In that case, the honeycomb type heating device 1 according to the present invention is preferably used in order to raise temperature of the honeycomb substrate 2 loaded with the catalyst for purifying the exhaust gas up to the catalyst active temperature of the catalyst or more before the engine starts, by causing each of the heaters 9 to generate the heat. When the honeycomb type heating device 1 according to the present invention is used in this manner, the catalyst that has been activated can efficiently purify a toxic component included in the exhaust gas immediately after the engine starts.

Figure 4:
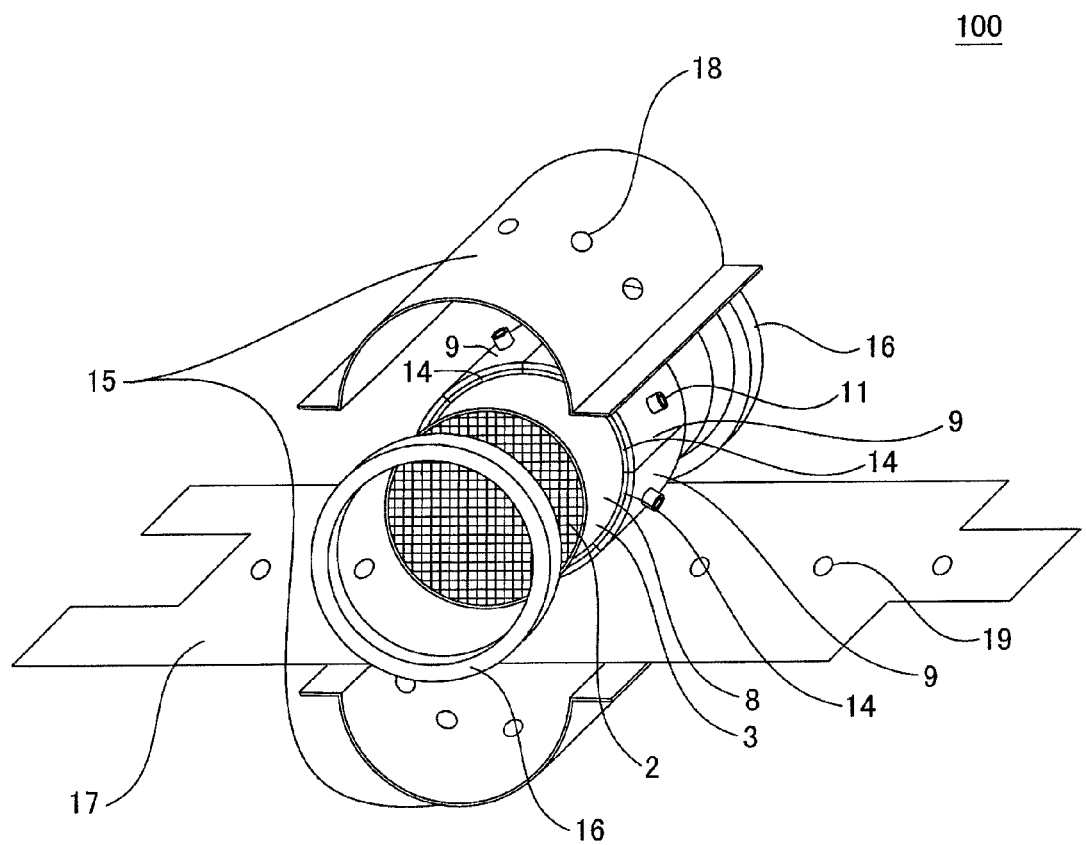
FIG. 4 is a schematic exploded view showing an exemplary canned honeycomb type heating device according to the present invention.
Figure 5:
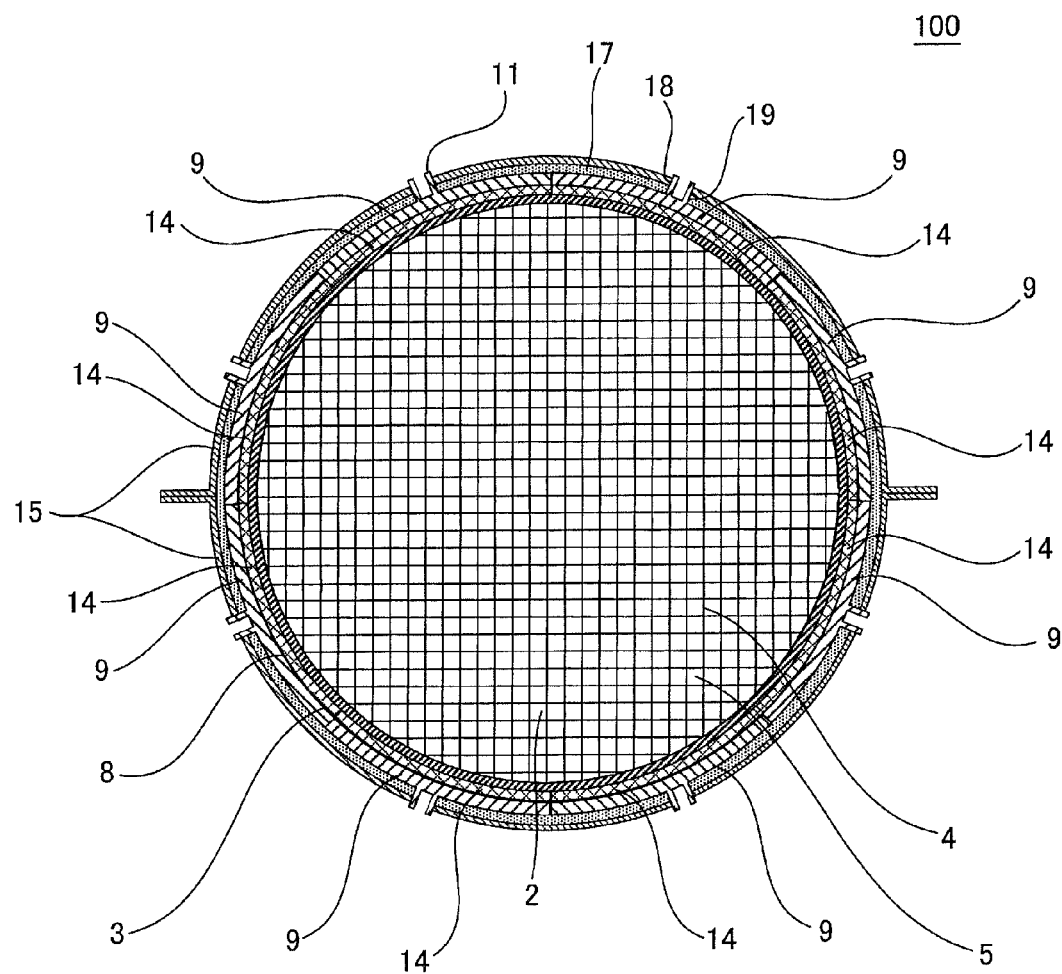
FIG. 5 is a schematic sectional view showing a section of the exemplary canned honeycomb type heating device according to the present invention, orthogonal to a length direction of the device (an axial direction)
Figure 6:
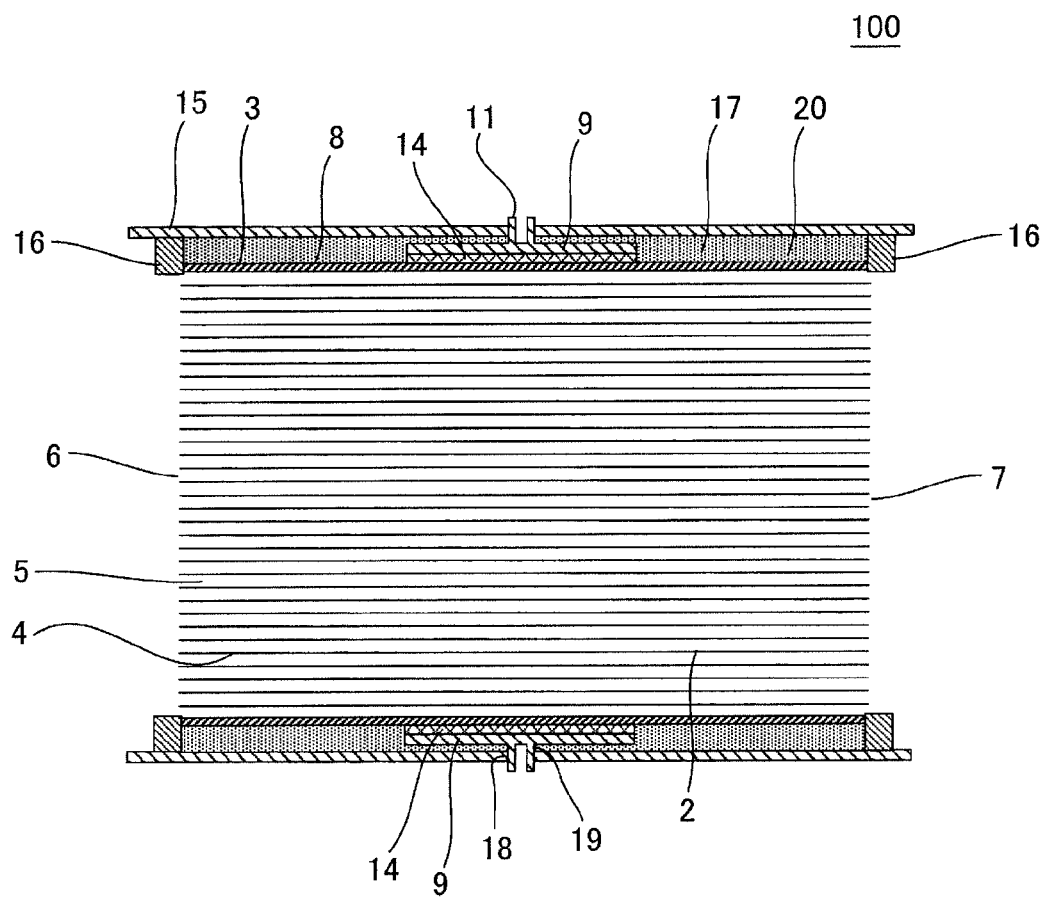
FIG. 6 is a schematic sectional view showing a section of the exemplary canned honeycomb type heating device of an embodiment according to the present invention, parallel to the length direction of the device (the axial direction)

(2) Canned Honeycomb Type Heating Device:

FIG. 4 is a schematic exploded view showing an exemplary canned honeycomb type heating device according to the present invention. FIG. 5 is a schematic sectional view showing a section of the exemplary canned honeycomb type heating device according to the present invention, orthogonal to a length direction of the device (an axial direction). FIG. 6 is a schematic sectional view showing a section of the exemplary canned honeycomb type heating device of an embodiment according to the present invention, parallel to the length direction of the device (the axial direction). As shown in FIGS. 4 to 6, the canned honeycomb type heating device 100 according to the present invention includes the honeycomb type heating device 1 according to the present invention housed in a tubular canning case 15.

The heating device used in the exhaust path of the exhaust gas is typically provided in a state of being housed in the tubular canning case 15. The canned honeycomb type heating device 100 according to the present invention includes the honeycomb type heating device 1 according to the present invention already housed in the canning case 15. Thus, the canned honeycomb type heating device 100 can be provided in the exhaust path of the exhaust gas so as to be used as it is.

The structure of the canning case is not particularly limited, but according to the embodiment shown in FIG. 4, the canning case 15 having a clamshell structure is used in order to facilitate the housing of the honeycomb substrate 2. The canning case 15 having the clamshell structure includes two members each having a semicircularly curved portion, and the two members are combined and then are joined so as to be tubular. The canning case 15 preferably includes through holes 18 which are formed through the canning case 15 and through which the electrode terminal protrusions 11 of the heaters 9 protrude to the outside of the canning case 15. When the electrode terminal protrusions 11 of the heaters 9 protrude to the outside of the canning case 15 through the through holes 18, wiring of the electric lines for energizing the heaters 9 can be performed outside the canning case 15.

Note that the electrode terminal protrusions 11 each preferably include a cap-shaped insulating member capable of covering the circumferential face thereof, attached thereto, in order to insulate the electrode terminal protrusions 11 from the canning case 15.

The canned honeycomb type heating device 100 according to the present invention preferably includes, as shown in FIG. 6, retainer rings 16 individually disposed in proximity to both end faces of the honeycomb substrate 2, in the canning case 15. When the retainer rings 16 are disposed in this manner, displacement of the honeycomb substrate 2 due to vibrations can be prevented. Furthermore, the retainer rings 16 prevent a fluid from flowing into a space 20 defined by the canning case 15, the honeycomb substrate 2, and the retainer rings 16. As a result, when the honeycomb type heating device 1 according to the present invention is provided in the exhaust path of the exhaust gas emitted from the engine so as to be used, the heaters 9 can be prevented from being exposed to condensed water (water vapor) included in the exhaust gas. Thus, the heaters 9 barely degrade.

The canned honeycomb type heating device 100 preferably includes, as shown in FIGS. 4 to 6, a heat-insulation member 17 disposed between each of the heaters 9 and the canning case 15. When the heat-insulation member 17 is disposed in this manner, the heat of the heaters 9 is barely released to the outside and the heat of the heaters 9 can be efficiently transmitted to the honeycomb substrate 2. The material of the heat-insulation member 17 is not particularly limited, but a ceramic fiber mat is preferably used because of easy disposition between each of the heaters 9 and the canning case 15 due to a wind around the circumference of the honeycomb substrate 2, and high heat-insulation properties. When the entire circumference of the honeycomb substrate 2 including the heaters 9 is wound with the heat-insulation member 17, the heat-insulation member 17 preferably includes through holes 19 which are formed and through which the electrode terminal protrusions 11 of the heaters 9 protrude to the outside of the canning case 15, as shown in FIGS. 4 to 6.

(3) Method of Manufacturing Honeycomb Type Heating Device:

A method of manufacturing a honeycomb type heating device according to the present invention is an exemplary method of manufacturing the honeycomb type heating device 1 according to the present invention described above. That is, the honeycomb type heating device 1 manufactured by the method of the manufacturing includes, as shown in FIGS. 1 to 3, the honeycomb substrate 2, the plurality of heaters 9, and the intermediate members 14. The honeycomb substrate 2 is pillar-shaped, and has the partition wall 4 defining the plurality of cells 5 extending from the one end face 6 to the other end face 7 and the circumferential wall 3 surrounding the partition wall 4. The cells 5 each act as the channel of the fluid, such as exhaust gas. The plurality of heaters 9 are adjacently arranged on the circumferential face 8 in the circumferential direction of the circumferential face 8 being the outside surface of the circumferential wall 3 of the honeycomb substrate 2. Each of the intermediate members 14 is arranged in the state of being interposed between the circumferential face 8 of the honeycomb substrate 2 and the plurality of heaters 9. A least a portion of each of the intermediate members 14 preferably has a thermal conductivity of 1 W/m·K or more. In the honeycomb type heating device 1, the sum of the areas of the portions of the circumferential face 8 covered with the intermediate members 14 between the circumferential face 8 of the honeycomb substrate 2 and the plurality of heaters 9, is 20 to 100% of the sum of the areas of the portions of the circumferential face 8 covered with the plurality of heaters 9. In the method of manufacturing the honeycomb type heating device according to the present invention, the above honeycomb type heating device 1 is manufactured by a method including "a paste applying process", "a heater arranging process", and "an intermediate member forming process" to be described below. Note that, when the honeycomb type heating device including the catalyst for purifying the exhaust gas loaded into the honeycomb substrate, is manufactured, a manufacturing method including "a catalyst loading process" to be described later, added to the processes is preferably used.

(3-1) Paste Applying Process:

During this process, paste for forming the intermediate members, including an SiC particle and colloidal silica is applied to portions of the circumferential face 8 of the honeycomb substrate 2 on which the respective heaters 9 are arranged, or the face of each of the heaters 9 facing the circumferential face 8 of the honeycomb substrate 2. Alternatively, the paste for forming the intermediate members, including the SiC particle and the colloidal silica may be applied to both of the portions of the circumferential face 8 of the honeycomb substrate 2 on which the respective heaters 9 are arranged, and the face of each of the heaters 9 facing the circumferential face 8 of the honeycomb substrate 2. The paste having a thermal conductivity of 1 W/m·K or more after drying, is preferably used. The above paste is obtained by containing the SiC particle and the colloidal silica to have a mass ratio of the SiC particle to silica included in the colloidal silica (the mass of the SiC particle: the mass of the silica), of approximately 30:70 to 80:20. Note that, a particle including a material having a high thermal conductivity, such as metal Si, may be added to the paste so as to adjust the thermal conductivity after the drying.

(3-2) Heater Arranging Process:

This process is performed after the paste applying process. During the process, the plurality of heaters 9 are adjacently arranged on the circumferential face 8 in the circumferential direction of the circumferential face 8 of the honeycomb substrate 2. The plurality of heaters 9 are arranged on the circumferential face 8 in a state where the paste applied during the paste applying process has been interposed.

(3-3) Intermediate Member Forming Process:

This process is performed after the heater arranging process. During the process, the paste interposed between the circumferential face 8 of the honeycomb substrate 2 and the plurality of heaters 9, is heated so as to be dried. The paste is dried (solidified) in this manner so that each of the intermediate members 14 is formed from the paste. The heating temperature in drying the paste is a temperature of 600° C. or less, and is preferably approximately 400 to 600° C., for example. When the heating is performed at the above temperature, thermal degradation of the catalyst due to the heating can be prevented even when the catalyst for purifying the exhaust gas is previously loaded into the honeycomb substrate 2 during the catalyst loading process to be described later.

(3-4) Catalyst Loading Process:

This process is performed before the paste applying process when the honeycomb type heating device 1 including the honeycomb substrate 2 loaded with the catalyst for purifying the exhaust gas is manufactured. During the process, the catalyst for purifying the exhaust gas is loaded into the partition wall 4 of the honeycomb substrate 2. As a specific loading method, for example, an aqueous solution including a catalyst component, such as precious metals, is previously impregnated into ceramics powder to be carrier fine particles, and then, drying and burning are performed so that catalyst coated fine particles are obtained. A dispersing medium (for example, water) and another addictive are added to the above obtained catalyst coated fine particles so that coating liquid (slurry) is prepared. The partition wall 4 of the honeycomb substrate 2 is coated with the slurry by a conventional known coating method, such as an aspiration method. After that, drying and burning are performed so that the catalyst is loaded into the partition wall 4 of the honeycomb substrate 2.

The honeycomb type heating device 1 according to the present invention can be manufactured by the method of the manufacturing including the above processes.

Note that, in the method of manufacturing the honeycomb type heating device according to the present invention, for example, the honeycomb substrate used as a constituent element in the honeycomb type heating device, can be prepared as follows: First, a forming raw material containing a ceramic raw material is prepared in order to prepare the honeycomb substrate. The powder capable of forming ceramics, exemplified above as the material of the honeycomb substrate, can be preferably used for the ceramic raw material. For example, when the Si—SiC composite is adopted as the constituent material of the honeycomb substrate, SiC powder is preferably used as the ceramic raw material. The forming raw material is preferably prepared by mixing the above ceramic raw material with an additive, such as a dispersing medium, an organic binder, an inorganic binder, or a surfactant, if necessary.

Next, the forming raw material is kneaded so as to form a pillar-shaped body. The method of kneading the fanning raw material and forming the body is not particularly limited. Examples of a preferred method can include a method with, for example, a kneader or a vacuum pugmill.

Next, a honeycomb formed body having a partition wall and a circumferential wall is extruded from the body with a die including a lattice-shaped slit formed, and then the honeycomb formed body is dried. The drying method is not particularly limited. Examples of a preferred drying method can include hot air drying, microwave drying, dielectric drying, decompression drying, vacuum drying, and freeze drying. The dielectric drying, the microwave drying, or the hot air drying is preferably independently performed or a combination thereof is preferably performed, out of the above methods.

Subsequently, the honeycomb formed body (a honeycomb dried body) after the drying is fired so that the honeycomb substrate is prepared. Note that, calcination (degreasing) is preferably performed in order to remove, for example, a binder included in the honeycomb formed body before firing (main firing). The conditions of the calcination are not particularly limited as long as the conditions of the calcination allow organic matter (for example, an organic binder) included in the honeycomb formed body to be removed (combusted). The conditions (for example, temperature, time, and atmosphere) of firing (main firing) the honeycomb formed body, vary in accordance with kinds of the forming raw material. Thus, appropriate conditions may be selected in accordance with the corresponding kind. For example, when the honeycomb substrate including the Si—SiC composite is prepared, massive metal Si is mounted on the honeycomb formed body including the SiC powder and then the massive metal Si on the honeycomb formed body is fired in a decompressed inert gas or a vacuum so that the metal Si is impregnated into the honeycomb formed body. The dense honeycomb substrate (the honeycomb substrate having a low porosity) in which the metal Si filled in a gap between SiC particles is obtained by the firing. Note that, the honeycomb substrate may include the stress relief, such as the slit, formed thereon, if necessary.

In the method of manufacturing the honeycomb type heating device according to the present invention, for example, the heaters used as constituent elements of the honeycomb type heating device can be prepared as follows: Note that a preparing method to be described below is an exemplary method of preparing a ceramic heater being a type of the resistance heating type heater. First, a sinter aid or a binder is appropriately added to a ceramic raw material, such as aluminum nitride, silicon nitride, or alumina, so that a forming raw material is obtained. The heating resistor is embedded in the forming raw material. Then, for example, a formed body having the concave arc-shaped face curved substantially the same as the circumferential face of the honeycomb substrate and the tubular electrode terminal protrusion on a face on the side opposite to the concave arc-shaped face is obtained by press molding and the like. Note that, the molding is performed while positioning an end portion (an electrode terminal) of the heating resistor to be exposed inside the tubular electrode terminal protrusion. Examples of the heating resistor that can be preferably used include silver (Ag), aluminum (Al), gold (Au), beryllium (Be), copper (Cu), magnesium (Mg), molybdenum (Mo), tungsten (W), ruthenium (Ru), and platinum (Pt). The heating resistor may be a compound, and, in this case, examples of the heating resistor that can be preferably used include a nitride, a carbide, a boride, or a silicide of each of zirconium (Zr), titanium (Ti), niobium (Nb), hafnium (Hf), tantalum (Ta), molybdenum (Mo), and tungsten (W). The formed body obtained in this manner is dried and calcined if necessary, and then is fired so that the ceramic heater including the heating resistor embedded inside the ceramic member is obtained. Note that, the insulating material including, for example, silicon nitride or alumina may be disposed on the concave arc-shaped face of the ceramic heater, if necessary.

(4) Method of Manufacturing the Canned Honeycomb Type Heating Device:

As an exemplary method of manufacturing the canned honeycomb type heating device 100 shown in FIGS. 4 to 6, the circumference of the honeycomb type heating device 1 obtained by the method of manufacturing the honeycomb type heating device according to the present invention, is first wound with the ceramic fiber mat (the heat-insulation member 17). Next, the retainer rings 16 are individually arranged in proximity to both of the end faces of the honeycomb substrate 2. Then, the retainer rings 16 are interposed between two members each having the semicircularly curved portion included in the canning case 15 having the clamshell structure, and then the two members are joined. The canned honeycomb type heating device 100 according to the present invention, including the honeycomb type heating device 1 housed in the tubular canning cases 15, is obtained by the above method.

(5) Method of Using a Honeycomb Type Heating Device

A honeycomb type heating device used in a method of using the honeycomb type heating device according to the present invention is the honeycomb type heating device 1 according to the present invention described above. That is, the honeycomb type heating device 1 including the honeycomb substrate 2, the plurality of heaters 9, and the intermediate members 14, shown in FIGS. 1 to 3 is used in the method of the using. In the honeycomb type heating device 1, the honeycomb substrate 2 is pillar-shaped, and includes the partition wall 4 defining the plurality of cells 5 extending from the one end face 6 to the other end face 7 and the circumferential wall 3 surrounding the partition wall 4. The cells 5 each act as a channel of a fluid, such as exhaust gas. The plurality of heaters 9 are adjacently arranged on the circumferential face 8 in the circumferential direction of the circumferential face 8 being the outside surface of the circumferential wall 3 of the honeycomb substrate 2. The honeycomb substrate 2 is loaded with the catalyst for the exhaust gas. Each of the intermediate members 14 is arranged in a state of being interposed between the circumferential face 8 of the honeycomb substrate 2 and the plurality of heaters 9. A least a portion of each of the intermediate members 14 preferably has a thermal conductivity of 1 W/m·K or more. In the honeycomb type heating device 1, the sum of the areas of the portions of the circumferential face 8 covered with the intermediate members 14 between the circumferential face 8 of the honeycomb substrate 2 and the plurality of heaters 9, is 20 to 100% of the sum of the areas of the portions of the circumferential face 8 covered with the plurality of heaters 9. Note that, the details of the honeycomb type heating device 1 are as described above.

The above honeycomb type heating device 1 is provided in the exhaust path of the exhaust gas emitted from the engine in the method of using the honeycomb type heating device according to the present invention. Then, each of the heaters 9 generates the heat so that temperature of the honeycomb substrate 2 loaded with the catalyst for purifying the exhaust gas rises up to the catalyst active temperature of the catalyst or more before the engine starts.

The above method of using the honeycomb type heating device according to the present invention can efficiently purify the toxic component included in the exhaust gas, with the catalyst that has been activated, immediately after the engine starts.

EXAMPLES

The present invention will be further described in detail below based on examples, but the present invention is not limited to the examples.

Example 1

A binder and water were added to SiC powder so that a forming raw material for a honeycomb substrate was prepared. The forming raw material was kneaded so that a pillar-shaped kneaded material was obtained. A round pillar-shaped honeycomb formed body having a partition wall defining a plurality of cells extending one end face to the other end face and a circumferential wall surrounding the partition wall, was obtained from the kneaded material by extrusion. After that, the honeycomb formed body was dried by a microwave and hot air so that a honeycomb dried body was obtained. Next, massive metal Si was mounted on the honeycomb dried body, and then the honeycomb dried body with the metal Si was fired in a vacuum furnace so that a honeycomb substrate formed by an Si—SiC composite was obtained. The honeycomb substrate obtained in this manner had a round pillar shape having a diameter of 93 mm and a length of 75 mm, a thickness of the circumferential wall of 2 mm, a thickness of the partition wall of 0.15 mm (6 mil), a cell shape of a regular hexagon, a cell density of 64 cells/cm² (400 cells/square inch). The honeycomb substrate had a thermal conductivity of 150 W/m·K, a Young's modulus of 300 GPa, and a thermal expansion coefficient of $4.2 \times 10^{-6}/°C$.

Next, a binder and water were added to $Si_3N_4$ powder so that a forming raw material for a heater was prepared. A plate formed body curved substantially the same as the circumferential face of the honeycomb substrate was prepared from the forming raw material for the heater, and then the plate formed body was fired so that a ceramic plate formed by $Si_3N_4$ was prepared. A heating resistor formed by platinum was printed on the ceramic plate, and then the ceramic plate that has been printed was fired again. The ceramic plate formed by $Si_3N_4$ was stuck on and bonded to the heating resistor so that a resistance heating type heater (a ceramic heater) having a concave arc-shaped face was obtained. The concave arc-shaped face of the heater had a width of 30 mm (the length of an arc-shaped portion) and a length of 65 mm (the length in a direction orthogonal to the arc-shaped portion).

Next, an SiC particle having an average particle diameter of 20 μm and colloidal silica were compounded so that the mass ratio of the SiC particle to silica included in the colloidal silica (the mass of the SiC particle:the mass of the silica) was 30:70 and paste for forming the intermediate members was prepared.

Subsequently, the paste for forming the intermediate members was applied to a portion of the circumferential face of the honeycomb substrate on which each heater was arranged. After that, an octet of the heaters obtained as described above was arranged to interpose the paste for forming the intermediate members, on the circumferential face of the honeycomb substrate. The heaters were adjacently arranged in a circumferential direction of the circumferential face of the honeycomb substrate. In this case, positions of the heaters were adjusted so that all intervals between the heaters adjacent to each other were equivalent in the circumferential direction of the circumferential face of the honeycomb substrate. In this manner, the honeycomb substrate including the heaters arranged on the circumferential face through the paste for forming the intermediate members was heated at 600° C. in the atmosphere and the paste for forming the intermediate members was dried (solidified) so that each of the intermediate members was formed.

Each of the intermediate members of a honeycomb type heating device, obtained in this manner had a thermal conductivity of 0.1 W/m·K, a Young's modulus of 0.1 GPa, a porosity of 30%, thermal expansion coefficient of $4.2 \times 10^{-6}/°C$, and thickness of 500 μm. The central angle of each of the heaters was 37° and the rate of an intermediate member installation area with respect to a heater installation area was 30%.

The circumference of the honeycomb substrate of the honeycomb type heating device was wound with a ceramic fiber mat (a heat-insulation member) and additionally retainer rings were individually arranged in proximity to both end faces of the honeycomb substrate. The ceramic fiber mat and the retainer rings were interposed between two members each having a semicircularly curved portion, included in a canning case having a clamshell structure. Then, the two members were joined together and the ceramic fiber mat and the retainer rings were housed in the canning case so that a canned honeycomb type heating device was obtained.

(Evaluation)

For the canned honeycomb type heating device that had been obtained, a substrate central temperature and a substrate average temperature were measured and additionally a thermal shock resistance test was performed by the following method.

(Substrate Central Temperature and Substrate Average Temperature)

The respective heaters of the canned honeycomb type heating device that had been obtained, were wired so as to be connected in series. Then, energization was performed so that an amount of energy given to the heaters was 300 kJ. Then, temperature of a circumferential wall proximity portion and temperature of an axial portion were measured at an intermediate portion in a length direction (an axial direction) of the honeycomb substrate heated by heat generated by the heaters due to the energization. Table 2 shows, as the "substrate central temperature", the temperature of the axial portion out of the temperature of the circumferential wall proximity portion and the temperature of the axial portion, measured in this manner. An average temperature between the temperature of the circumferential wall proximity portion and the temperature of the axial portion, was calculated and shown as the "substrate average temperature" in Table 2.

(Thermal Shock Resistance Test (Burner Test))

A heating and cooling test of the honeycomb type heating device was performed by using a propane gas burner tester including a propane gas burner capable of supplying heating gas into the canning case of the canned honeycomb type heating device. The gas burner (the propane gas burner) burnt the propane gas so as to generate the heating gas. Then, the heating and cooling test ascertained whether a crack occurred in the honeycomb substrate of the honeycomb type heating device, so that thermal shock resistance was evaluated. Specifically, the gas (the heating gas) heated by the propane gas burner was supplied into the canning case of the canned honeycomb type heating device so as to pass inside the honeycomb substrate. A temperature condition of the heating gas flowing into the canning case (an inlet gas temperature condition) was as follows: First, the temperature rose up to a designation temperature in five minutes and was retained at a designation temperature for 10 minutes. After that, cooling was performed so that the temperature decreased to 100° C. in five minutes, and the temperature was retained at 100° C. for 10 minutes. The series of operations of the temperature rise, the cooling, and the retention, is referred to as a "temperature rise and cooling operation". After the "temperature rise and cooling operation", it was examined whether the crack had occurred in the honeycomb substrate. Then, the "temperature rise and cooling operation" was repeated while increasing the designation temperature from 825° C. by every 25° C. Table 2 shows, as the "thermal shock resistance", the designation temperature when it was ascertained that the crack had occurred in the honeycomb substrate.

Comparative Example 1

A canned honeycomb type heating device according to Comparative Example 1 was obtained in a manner similar to Example 1 except that intermediate members were not formed. For the canned honeycomb type heating device according to Comparative Example 1, a substrate central temperature and a substrate average temperature were measured and additionally a thermal shock resistance test was performed, similarly to the canned honeycomb type heating device according to Example 1.

Examples 2 to 9 and Comparative Example 2

Canned honeycomb type heating devices according to Examples 2 to 9 and Comparative Example 2 were obtained in a manner similar to Example 1 except that the rate of an intermediate member installation area with respect to a heater installation area and the mass ratio of an SiC particle to silica in paste for forming intermediate members were altered as shown in Table 1. For the honeycomb type heating devices according to Examples 2 to 9 and Comparative Example 2, substrate central temperatures and substrate average temperatures were measured and additionally thermal shock resistance tests were performed, similarly to the canned honeycomb type heating device according to Example 1.

Example 10

A canned honeycomb type heating device according to Example 10 was obtained in a manner similar to Example 1 except that the rate of an intermediate member installation area with respect to a heater installation area was altered as shown in Table 1 and additionally a carbonaceous sheet was selected as each of intermediate members. For the canned honeycomb type heating device according to Example 10, a substrate central temperature and a substrate average temperature were measured and additionally a thermal shock resistance test was performed, similarly to the canned honeycomb type heating device according to Example 1.

Example 11

A canned honeycomb type heating device according to Example 11 was obtained in a manner similar to Example 1 except that the rate of an intermediate member installation area with respect to a heater installation area was altered as shown in Table 1 and additionally a mat including a stainless fiber was selected as each of intermediate members. For the canned honeycomb type heating device according to Example 11, a substrate central temperature and a substrate average temperature were measured and additionally a thermal shock resistance test was performed, similarly to the canned honeycomb type heating device according to Example 1.

TABLE 1

| | HEATER | | | | | INERMEDIATE MEMBER | | | | | | RATE OF INTERMEDIATE MEMBER INSTALLATION AREA TO HEATER INSTALLATION AREA (%) |
|---|---|---|---|---|---|---|---|---|---|---|---|---|
| | CENTRAL ANGLE (°) | WIDTH (mm) | LENGTH (mm) | NUMBER OF ARRANGEMENTS NUMBER | HEATER INSTALLATION AREA (mm²) | PRESENT OR ABSENT | MATERIAL | PROPERTY | POROSITY (%) | THERMAL CONDUCTIVITY (W/m·K) | YOUNG'S MODULUS (GPa) | MEMBER INSTALLATION AREA (mm²) | |
| COMPARATIVE EXAMPLE 1 | 37 | 30 | 65 | 8 | 15600 | ABSENT | — | — | — | — | — | — | — |
| COMPARATIVE EXAMPLE 2 | 37 | 30 | 65 | 8 | 15600 | PRESENT | SiC (30% BY MASS) SILICA (70% BY MASS) | INORGANIC PARTICLES + INORGANIC BONDING AGENT | 30 | 0.1 | 0.1 | 1560 | 10 |
| EXAMPLE 1 | 37 | 30 | 65 | 8 | 15600 | PRESENT | SiC (30% BY MASS) SILICA (70% BY MASS) | INORGANIC PARTICLES + INORGANIC BONDING AGENT | 30 | 0.1 | 0.1 | 4680 | 30 |
| EXAMPLE 2 | 37 | 30 | 65 | 8 | 15600 | PRESENT | SiC (30% BY MASS) SILICA (70% BY MASS) | INORGANIC PARTICLES + INORGANIC BONDING AGENT | 30 | 0.1 | 0.1 | 9360 | 60 |
| EXAMPLE 3 | 37 | 30 | 65 | 8 | 15600 | PRESENT | SiC (30% BY MASS) SILICA (70% BY MASS) | INORGANIC PARTICLES + INORGANIC BONDING AGENT | 30 | 0.1 | 0.1 | 12480 | 80 |
| EXAMPLE 4 | 37 | 30 | 65 | 8 | 15600 | PRESENT | SiC (30% BY MASS) SILICA (70% BY MASS) | INORGANIC PARTICLES + INORGANIC BONDING AGENT | 30 | 0.1 | 0.1 | 15600 | 100 |

TABLE 1-continued

| | HEATER | | | | | | INERMEDIATE MEMBER | | | | | | RATE OF INTERMEDIATE MEMBER |
|---|---|---|---|---|---|---|---|---|---|---|---|---|---|
| | CENTRAL ANGLE (°) | WIDTH (mm) | LENGTH (mm) | NUMBER OF ARRANGEMENTS NUMBER | HEATER INSTALLATION AREA (mm²) | PRESENT OR ABSENT | MATERIAL | PROPERTY | POROSITY (%) | THERMAL CONDUCTIVITY (W/m·K) | YOUNG'S MODULUS (GPa) | MEMBER INSTALLATION AREA (mm²) | INSTALLATION AREA TO HEATER INSTALLATION AREA (%) |
| EXAMPLE 5 | 37 | 30 | 65 | 8 | 15600 | PRESENT | SiC (10% BY MASS) SILICA (90% BY MASS) | INORGANIC PARTICLES + INORGANIC BONDING AGENT | 30 | 0.5 | 0.1 | 4680 | 30 |
| EXAMPLE 6 | 37 | 30 | 65 | 8 | 15600 | PRESENT | SiC (20% BY MASS) SILICA (80% BY MASS) | INORGANIC PARTICLES + INORGANIC BONDING AGENT | 30 | 1 | 0.1 | 4680 | 30 |
| EXAMPLE 7 | 37 | 30 | 65 | 8 | 15600 | PRESENT | SiC (60% BY MASS) SILICA (40% BY MASS) | INORGANIC PARTICLES + INORGANIC BONDING AGENT | 20 | 3 | 1 | 4680 | 30 |
| EXAMPLE 8 | 37 | 30 | 65 | 8 | 15600 | PRESENT | SiC (70% BY MASS) SILICA (30% BY MASS) | INORGANIC PARTICLES + INORGANIC BONDING AGENT | 15 | 4 | 3 | 4680 | 30 |
| EXAMPLE 9 | 37 | 30 | 65 | 8 | 15600 | PRESENT | SiC (80% BY MASS) SILICA (20% BY MASS) | INORGANIC PARTICLES + INORGANIC BONDING AGENT | 10 | 5 | 5 | 4680 | 30 |
| EXAMPLE 10 | 37 | 30 | 65 | 8 | 15600 | PRESENT | CARBON | SHEET | — | 100 | 5 | 4680 | 30 |
| EXAMPLE 11 | 37 | 30 | 65 | 8 | 15600 | PRESENT | STAINLESS | MAT | — | 30 | 1 | 4680 | 30 |

TABLE 2

| | EVALUATION | | |
|---|---|---|---|
| | SUBSTRATE CENTRAL TEMPERATURE (° C.) | SUBSTRATE AVERAGE TEMPERATURE (° C.) | THERMAL SHOCK RESISTANCE (° C.) |
| COMPARATIVE EXAMPLE 1 | 200 | 250 | 850 |
| COMPARATIVE EXAMPLE 2 | 240 | 290 | 890 |
| EXAMPLE 1 | 250 | 310 | 910 |
| EXAMPLE 2 | 265 | 340 | 940 |
| EXAMPLE 3 | 275 | 360 | 960 |
| EXAMPLE 4 | 285 | 380 | 980 |
| EXAMPLE 5 | 280 | 400 | 920 |
| EXAMPLE 6 | 300 | 450 | 950 |
| EXAMPLE 7 | 310 | 460 | 950 |
| EXAMPLE 8 | 315 | 465 | 940 |
| EXAMPLE 9 | 320 | 470 | 930 |
| EXAMPLE 10 | 360 | 500 | 940 |
| EXAMPLE 11 | 335 | 475 | 960 |

(Discussion)

As shown in Table 2, it was ascertained that any of the honeycomb type heating devices according to Examples 1 to 11, having a rate of the intermediate member installation area with respect to the heater installation area of 20 to 100%, had a "substrate average temperature" of 300° C. or more higher than the active temperature of the catalyst and the heat of the heaters was efficiently transmitted to the honeycomb substrate. Any of the honeycomb type heating devices according to Examples 1 to 11 had a "thermal shock resistance" of 900° C. or more that was high. This would be because temperature of the entirety of each honeycomb substrate rose uniformly and a large thermal stress barely occurred in each honeycomb substrate. Furthermore, it was ascertained that any of the honeycomb type heating devices according to Examples 6 to 11, including the intermediate members having a thermal conductivity of 1 W/m·K or more, had a "substrate central temperature" of 300° C. or more higher than the active temperature of the catalyst and the heat of the heaters was particularly efficiently transmitted to the honeycomb substrate. Meanwhile, the honeycomb type heating device including the intermediate members not formed thereon according to Comparative Example 1, had a "substrate average temperature" of 250° C. and a "substrate central temperature" of 200° C. lower than those of the honeycomb type heating devices according to Examples 1 to 11. Furthermore, the honeycomb type heating device according to Comparative Example 1 had a "thermal shock resistance" of 850° C. lower than those of the honeycomb type heating devices according to Examples 1 to 11. The honeycomb type heating device having a rate of the intermediate member installation area with respect to the heater installation area of 10% according to Comparative Example 2, had a "substrate average temperature" of 290° C. and a "substrate central temperature" of 240° C. lower than those of the honeycomb type heating devices according to Examples 1 to 11. Furthermore, the honeycomb type heating device according to Comparative Example 2, had a "thermal shock resistance" of 890° C. lower than those of the honeycomb type heating devices according to Examples 1 to 11.

The present invention can be preferably used as a honeycomb type heating device for raising temperature of a catalyst for purifying exhaust gas up to the active temperature thereof at an early stage, provided in an exhaust path of the exhaust gas emitted from an engine of, for example, a motor vehicle, and additionally the invention can be used as a method of using the honeycomb type heating device and a method of manufacturing the honeycomb type heating device.

DESCRIPTION OF REFERENCE NUMERALS 1 honeycomb type heating device
2 honeycomb substrate
3 circumferential wall
4 partition wall
5 cell
6 one end face
7 other end face
8 circumferential face
9 heater
10 concave arc-shaped face (face facing circumferential face of honeycomb substrate)
11 electrode terminal protrusion
12 slit
13 insulating material
14 intermediate member
15 canning case
16 retainer ring
17 heat-insulation member
18 through hole
19 through hole
20 space
100 canned honeycomb type heating device
O center
α central angle

What is claimed is:
1. A honeycomb type heating device comprising:
a pillar-shaped honeycomb substrate having a partition wall defining a plurality of cells extending from one end face to the other end face and a circumferential wall surrounding the partition wall;
a plurality of heaters adjacently arranged on a circumferential face that is an outside surface of the circumferential wall in a circumferential direction of the circumferential face; and
intermediate members interposed between the circumferential face of the honeycomb substrate and the plurality of heaters,
wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters.
2. The honeycomb type heating device according to claim 1, wherein a thermal conductivity of at least a portion of each of the intermediate members is 1 W/m·K or more.

3. The honeycomb type heating device according to claim 1, wherein a Young's modulus of each of the intermediate members is 0.01 to 30 GPa.
4. The honeycomb type heating device according to claim 1, wherein a porosity of each of the intermediate members is 0 to 70%.
5. The honeycomb type heating device according to claim 1, wherein each of the intermediate members includes inorganic particles and an inorganic bonding agent.
6. The honeycomb type heating device according to claim 5, wherein an average particle diameter of the inorganic particles is 1 to 100 μm.
7. The honeycomb type heating device according to claim 1, wherein each of the plurality of heaters is a resistance heating type heater that generates heat due to energization.
8. The honeycomb type heating device according to claim 1, wherein each of the plurality of heaters is a reaction heat type heater that generates heat due to chemical reaction.
9. The honeycomb type heating device according to claim 7, wherein the plurality of heaters are electrically coupled in series or in parallel and has electric resistance endurable against application of a high voltage of 200 V or more.
10. The honeycomb type heating device according to claim 7, wherein each of the plurality of heaters has an insulating function for preventing an electric current from flowing from each of the plurality of heaters to the honeycomb substrate.
11. The honeycomb type heating device according to claim 1, wherein the honeycomb substrate is formed by a ceramic material having a thermal conductivity of 20 W/m·K or more.
12. The honeycomb type heating device according to claim 1, wherein the thickness of the circumferential wall is thicker than the thickness of the partition wall.
13. The honeycomb type heating device according to claim 1, wherein stress relief is formed on the honeycomb substrate.
14. The honeycomb type heating device according to claim 1, wherein a catalyst for purifying exhaust gas is loaded into the honeycomb substrate.
15. The honeycomb type heating device according to claim 14, wherein the honeycomb type heating device is provided in an exhaust path of exhaust gas emitted from an engine, and used for causing each of the heaters to generate heat to raise temperature of the honeycomb substrate loaded with the catalyst for purifying the exhaust gas up to a catalyst active temperature of the catalyst or more before the engine starts.
16. A canned honeycomb type heating device being formed by the honeycomb type heating device according to claim 1 that is housed in a tubular canning case.
17. A method of using a honeycomb type heating device, comprising:
providing the honeycomb type heating device in an exhaust path of exhaust gas emitted from an engine; and
raising temperature of a pillar-shaped honeycomb substrate up to a catalyst active temperature of a catalyst or more by causing each of a plurality of heaters to generate heat before the engine starts,
the honeycomb type heating device including:
the pillar-shaped honeycomb substrate having a partition wall defining a plurality of cells extending from one end face to the other end face and a circumferential wall surrounding the partition wall;

the plurality of heaters adjacently arranged on a circumferential face that is an outside surface of the circumferential wall in a circumferential direction of the circumferential face; and intermediate members interposed between the circumferential face of the honeycomb substrate and the plurality of heaters, wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters, and wherein the catalyst for purifying the exhaust gas is loaded into the honeycomb substrate.

18. A method of manufacturing a honeycomb type heating device, comprising:

applying paste for forming intermediate members, including SiC particles and colloidal silica, to portions of a circumferential face of a pillar-shaped honeycomb substrate on which each of a plurality of heaters is arranged and/or a face of each of the plurality of heaters facing the circumferential face of the honeycomb substrate;

arranging the plurality of heaters adjacently, with the paste interposed between the plurality of heaters and the circumferential face, on the circumferential face in a circumferential direction of the circumferential face of the honeycomb substrate after the applying; and forming the intermediate members from the paste by heating and drying the paste after the arranging, the honeycomb type heating device including:

the pillar-shaped honeycomb substrate having a partition wall defining a plurality of cells extending from one end face to the other end face and a circumferential wall surrounding the partition wall;

the plurality of heaters adjacently arranged on the circumferential face that is an outside surface of the circumferential wall in the circumferential direction of the circumferential face; and the intermediate members interposed between the circumferential face of the honeycomb substrate and the plurality of heaters, wherein the sum of areas of portions of the circumferential face covered with the intermediate members between the circumferential face of the honeycomb substrate and the plurality of heaters is 20 to 100% of the sum of areas of portions of the circumferential face covered with the plurality of heaters.

19. The method of manufacturing the honeycomb type heating device according to claim 18, further comprising loading a catalyst for purifying exhaust gas into the partition wall of the honeycomb substrate before the applying.

* * * * *